(12) United States Patent
Honda et al.

(10) Patent No.: US 7,449,199 B2
(45) Date of Patent: Nov. 11, 2008

(54) NANOSTRUCTURAL SUBSTANCE

(75) Inventors: Tomohiro Honda, Hiroshima (JP); Tomoaki Urai, Iwakuni (JP); Katsuaki Kurata, Saeki-gun (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 11/258,383

(22) Filed: Oct. 26, 2005

(65) Prior Publication Data

US 2006/0116282 A1 Jun. 1, 2006

(30) Foreign Application Priority Data

Nov. 5, 2004 (JP) ............................. 2004-322635

(51) Int. Cl.
*A61K 9/14* (2006.01)
*A61K 33/00* (2006.01)
*A01N 59/00* (2006.01)

(52) U.S. Cl. ........................ 424/489; 424/600; 424/602; 424/618; 424/641; 424/646; 424/630; 424/682

(58) Field of Classification Search ................. 424/489, 424/600, 602, 618, 630, 641, 646, 682
See application file for complete search history.

(56) References Cited

U.S. PATENT DOCUMENTS

2004/0250750 A1* 12/2004 Reda et al. .................... 117/84

OTHER PUBLICATIONS

Turkevich et al, "A Study of the Nucleation and Growth Processes in the Synthesis of Colloidal Gold", May 18, 1951; Discussion Faraday Soc., 1951, 11, 55-75, DOI 10.1039/DF9511100055.
Creighton et al, "Plasma Resonance Enhancement of Raman Scattering by Pyridine Adsorbed on Silver or Gold Sol Particles of Size Comparable to the Excitation Wavelength", J. Chem. Soc., Faraday Trans. 2, 1979, 75, 790-798, DOI: 10.1039/F29797500790.

* cited by examiner

*Primary Examiner*—Johann Richter
*Assistant Examiner*—Konata M. George
(74) *Attorney, Agent, or Firm*—Nixon & Vanderhye P.C.

(57) ABSTRACT

The present invention relates to a nanostructural substance constituted from primary particles having a particle diameter of not more than 30 nm. In the nanostructural substance of the present invention, the primary particles have a small particle diameter, and a contact surface between the primary particles is small. In particular, since the nanostructural substance of the present invention has a large content of molecules existing at the surface thereof and, therefore, a high surface energy as compared to simple agglomerated particles, it is expected to more remarkably exhibit functions of the compound constituting the primary particles.

In addition, titanium oxide particles constituted from the nanostructural substance comprising primary particles having a small particle diameter and a small contact area therebetween according to the present invention exhibit a high catalytic activity and can be suitably used, in particular, as a photocatalyst.

10 Claims, 12 Drawing Sheets

NANOSTRUCTURAL SUBSTANCE

BACKGROUND OF THE INVENTION

The present invention relates to a nanostructural substance, and more particularly, to a nanostructural substance composed of primary particles (nanoparticles) having a small particle size and having a small contact area between the primary particles. In particular, titanium oxide particles constituted of a nanostructural substance of titanium exhibit a high catalytic activity and can be suitably used, in particular, as a photocatalyst.

When particles are finely divided into nano-order particles, the percentage of molecules occupying the surface of the respective particles becomes extremely large, so that the nano-order particles show a quite different properties from those of bulk materials. In particular, it is known that titanium oxide particles having a nano-order particle size exhibit a high activity. Therefore, it has been attempted to utilize such properties of the titanium oxide particles in various applications such as catalysts, cell or battery materials, magnetic materials, electronic circuit devices and biological materials. However, such nanoparticles tend to be strongly agglomerated together due to very fine particles and to be hardly dispersed in a monodisperse condition, thereby failing to fully exhibit properties thereof. In particular, the titanium oxide particles having a photocatalytic activity have a strong agglomerating force due to fine particles, so that it may be difficult to disperse the titanium oxide particles to such an extent as to exhibit sufficient functions thereof.

Hitherto, although various techniques for dispersing nanoparticles have been reported, many of these techniques relate to the dispersion and fixing of the nanoparticles onto the surface or into the inside of a third solid phase, e.g., an inorganic carrier such as alumina or a polymeric carrier such as resins.

For example, in Japanese Patent Application Laid-Open (KOKAI) No. 2003-112925, there is described a method of bonding surface-modified molecules having a molecular weight of not more than 1000 to magnetite nanoparticles to improve a dispersibility of the nanoparticles in an organic solvent; applying a dispersion of the nanoparticles onto the surface of a substrate; and then drying the dispersion applied to disperse and fix the nanoparticles thereon.

In Japanese Patent Application Laid-Open (KOKAI) No. 2003-297617, there is described a method of rapidly dropping a dispersion of nanoparticles synthesized by a reversed micelle method onto a substrate and drying the dispersion to form such a structure in which the particles in a nanometer scale are arranged in a self-organizing manner.

In Japanese Patent Application Laid-Open (KOKAI) No. 10-208236 (1998), there is described a method of dispersing and fixing nanoparticles of cobalt ferrite within an ion-exchange resin. Also, in Japanese Patent Application Laid-Open (KOKAI) No. 2001-316501, there is described a method of dispersing and fixing nanoparticles in a polymer having a crosslinked structure.

The above conventional methods of dispersing the nanoparticles require fixing of the nanoparticles to the third solid phase or in the presence of the third solid phase. However, in these methods, the nanoparticles may fail to be dispersed in a monodisperse state, and since a large portion or a part of the surface of the respective nanoparticles is covered with the third solid phase, it may be difficult to exhibit the performance of the nanoparticles to a maximum extent. Further, the third solid phase is inevitably required for dispersing the nanoparticles, resulting in limited applications thereof as well as complicated production process.

On the other hand, there are also known methods of producing high-functional particles by controlling a pore volume or a BET specific surface area thereof (Japanese Patent Application Laid-Open (KOKAI) Nos. 8-281060 (1996), 11-349328 (1999), 2000-203810, 2001-342010, 10-230169 (1998), 2000-191325 and 2001-114519, and PCT Pamphlet WO 99/1574).

Further, As one of methods for producing inorganic compound particles, there is known a spray thermal decomposition method.

In the spray thermal decomposition method, a raw material solution is sprayed through a nozzle or by irradiation of ultrasonic wave to form fine droplets, and then a solvent contained in the fine droplets is evaporated and thermally decomposed to obtain aimed particles.

Conventionally, there is also known the spray thermal decomposition method for producing fine oxide or metal particles (Japanese Patent Application Laid-Open (KOKAI) Nos. 2001-342010 and 5-139738 (1993)).

Although at present, it has been most demanded to provide a nanostructural substance in the form of nanoparticles which are less contacted with each other and exhibit a good handling property, such a nanostructural substance has not been obtained until now.

That is, in Japanese Patent Application Laid-Open (KOKAI) No. 8-281060 (1996), there are described alumina, titania and zirconia having a large BET specific area value. However, primary particles of these materials may fail to have a sufficiently small particle size.

Also, in Japanese Patent Application Laid-Open (KOKAI) No. 11-349328 (1999), there are described titanium oxide particles whose agglomerated particles have an average particle diameter of 0.1 to 10 μm and whose primary particles have an average particle diameter of 10 to 1000 nm. However, the primary particles may fail to have a sufficiently small particle size. Further, although there are also described titanium oxide particles whose agglomerated particles are well controlled in average particle diameter, the titanium oxide particles are still small in BET specific surface area and, therefore, may fail to attain a sufficient contact efficiency.

Also, in Japanese Patent Application Laid-Open (KOKAI) No. 2000-203810, there are described hollow oxide particles having a shell thickness of not more than 20 nm. Although the specific surface area of the particles is increased by changing a surface condition thereof, the control of size of the primary particles is not taken into consideration in this Japanese KOKAI.

In addition, although Japanese Patent Application Laid-Open (KOKAI) No. 2001-342010 describes inorganic hollow particles, the aim of the invention of this Japanese KOKAI is to obtain hollow particles having a dense coating layer thereon, and therefore, the control of size of the primary particles is not taken into consideration in this Japanese KOKAI.

Further, although Japanese Patent Application Laid-Open (KOKAI) No. 5-139738 (1993) describes hollow zinc oxide particles, primary particles thereof tend to have a large particle size and a large contact area therebetween.

Also, in Japanese Patent Application Laid-Open (KOKAI) No. 2003-19427, there is described a method of producing fine particles by spray thermal decomposition method in which an inorganic compound other than raw materials is dissolved in a raw material solution. In the method of this KOKAI, a low-melting substance is used as the inorganic compound, and the heating temperature is set to not less than a melting point of the inorganic compound used. Under such a condition, crystal nuclei produced by thermal decomposition of the raw materials are contacted with the inorganic compound in a liquid state to allow the inorganic compound to exist between a plurality of crystal nuclei produced in the respective droplets, thereby forming fine primary particles. Therefore, in this method, the nanostructural substance in which the primary particles are present in a point contact with each other is not taken into consideration.

Furthermore, in Japanese Patent Application Laid-Open (KOKAI) No. 10-230169 (1998), although there are described titanium oxide particles having a crystallite size of 6 to 20 nm, the control of particle configuration of the titanium oxide particles is not taken into consideration. In Japanese Patent Application Laid-Open (KOKAI) No. 2000-191325, although there are described titanium oxide particles which are controlled in particle diameters of primary particles and agglomerated particles thereof, the control of particle configuration of the titanium oxide particles is not taken into consideration. In Japanese Patent Application Laid-Open (KOKAI) No. 2001-114519, although there is described titanium oxide which has a small crystallite size and is well controlled in pore volume, the control of particle configuration of the titanium oxide is not taken into consideration. Further, in PCT Pamphlet WO 99/11574, although there are described hollow titanium oxide particles, titanium oxide particles composed of fine primary particles are not taken into consideration.

As a result of the present inventors' earnest study for solving the above problems, it has been found that by sintering fine primary particles at points with each other to form spherical-shaped particles or a thin film-shaped material, it is possible to obtain a nanostructural substance which is easily handled without deactivation of properties inherent to nanoparticles. The present invention has been attained on the basis of this finding.

Thus, according to the present invention, there is provided an innovative technique capable of realizing a good dispersion of the objective nanoparticles by themselves without requiring a third solid phase.

SUMMARY OF THE INVENTION

An object of the present invention is to provide a nanostructural substance composed of nanoparticles which is minimized in contact area between the nanoparticles, and is easy to handle.

Another object of the present invention is to provide titanium oxide particles constituted from a nanostructural substance composed of nanoparticles which are minimized in contact area between the nanoparticles, and are easy to handle.

To accomplish the aims, in a first aspect of the present invention, there is provided a nanostructural substance comprising primary particles (nanoparticles) having a particle diameter of not more than 30 nm.

In a second aspect of the present invention, there is provided the nanostructural substance comprising a thin film-shaped material or a spherical-shaped material.

In a third aspect of the present invention, there is provided the nanostructural substance wherein the spherical-shaped nanostructural substance has an average particle diameter of 50 nm to 20 μm.

In a fourth aspect of the present invention, there is provided the nanostructural substance wherein the primary particles (nanoparticles) constituting the nanostructural substance are composed of an oxide, a metal or a composite material thereof.

In a fifth aspect of the present invention, there are provided titanium oxide particles comprising a titanium oxide nanostructural substance comprising primary particles (nanoparticles) composed of titanium oxide and having an average particle diameter of not more than 30 nm.

In a six aspect of the present invention, there is provided a photocatalyst comprising the above titanium oxide particles.

DETAILED DESCRIPTION OF THE INVENTION

Figure 1:
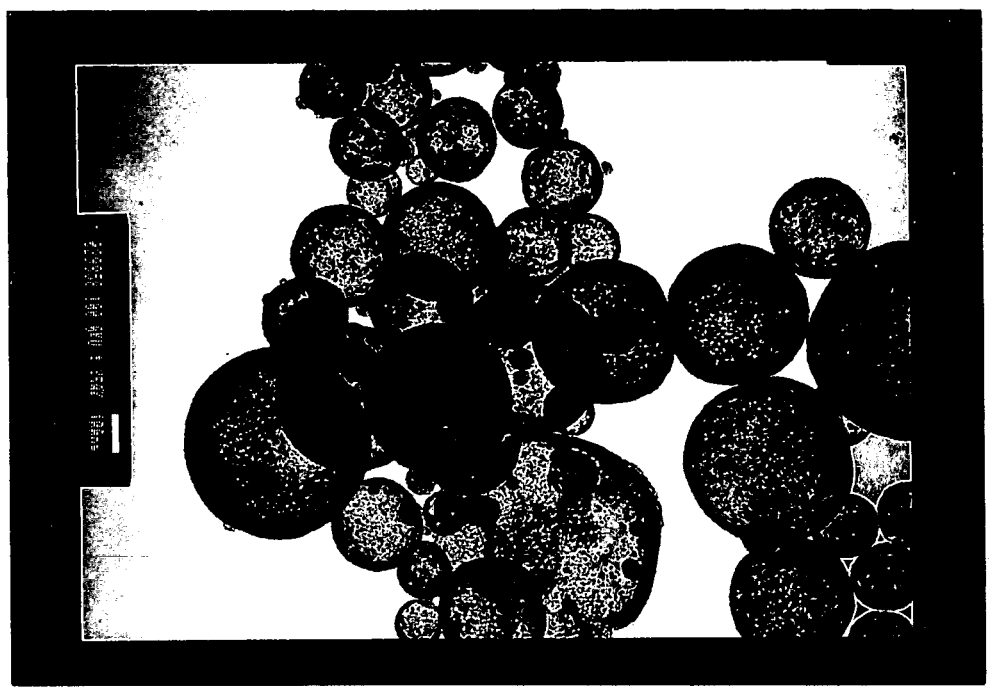
FIG. 1 is a scanning electron micrograph showing a particle shape of a hollow nanostructural substance obtained in Example 1 (magnification: ×50000).

The present invention is described in detail below.

The primary particles (nanoparticles) constituting the nanostructural substance of the present invention have an average particle diameter of not more than 30 nm. When the average particle diameter of the primary particles is more than 30 nm, the primary particles become coarse particles, so that the nanostructural substance tends to be deteriorated in functions as fine particles. The average particle diameter of the primary particles is preferably not more than 18 nm, more preferably not more than 15 nm. The lower limit of the average particle diameter of the primary particles is about 0.5 nm.

The nanostructural substance of the present invention has either a hollow or solid spherical shape, or a thin film shape, or may be made of a mixture of materials having these shapes. In the case where the nanostructural substance has a spherical shape, the spherical shape may include a fragment thereof as a partially cut-out shape of sphere. Meanwhile, the term "hollow" means such a condition that the primary particles are present only in a surface layer portion of the spherical particles, whereas the term "solid" means such a condition that the primary particles are present not only in the surface layer portion of the spherical particles but also in an inside portion thereof. In any of the hollow and solid particles, the contact area therebetween is controlled to a small level.

When the nanostructural substance has a spherical shape, the average particle diameter thereof is usually 0.05 to 20 μm, preferably 0.1 to 10 μm in the consideration of handling property.

The nanostructural substance having a thin film shape may be constituted from a one-layered or multilayered film, and the thickness thereof is usually 0.5 to 100 nm, preferably 10 to 50 nm.

In the nanostructural substance of the present invention, the diameter of the primary particles of the nanostructural substance as calculated from results of measurement by an electron microscope is substantially identical to a crystallite size of the nanostructural substance as calculated from results of X-ray diffraction analysis. The ratio of the diameter of the primary particles of the nanostructural substance as calculated from results of measurement by an electron microscope to the crystallite size of the nanostructural substance as calculated from results of X-ray diffraction analysis is usually 0.8 to 1.25, preferably 0.9 to 1.10. When the ratio is less than 0.8, the primary particles may fail to form a single crystal. When the ratio is closer to 1.0, the primary particles become nearer to a single crystal.

The nanostructural substance of the present invention preferably has a BET specific surface area value of 50 to 6000 $m^2/g$.

Examples of the main constitutional elements of the primary particles constituting the nanostructural substance according to the present invention may include Ti, Fe, Ce, Zr, Ni, Zn, Cd, Si, Mg, Al, Ca, Pd, Ag, Ba, Cu, Li, Co, La, Y, Sr, Mn, Rh, Pt, Nd, Sm, Pb, Cr, Ga and Sc. Among these elements, preferred are Ti, Fe, Ce, Zr, Ni, Zn, Cd, Mg, Al, Ca, Pd, Ag, Ba, Cu, Co, La, Y, Sr, Mn, Rh, Pt, Nd, Sm, Pb, Cr, Ga and Sc, and more preferred are Ti, Fe, Ce, Zr and Al.

The primary particles constituting the nanostructural substance of the present invention may be constituted from a single substance of the above elements, or a mixture or oxide thereof. In addition, the primary particles constituting the nanostructural substance may also be constituted from a composite oxide or a alloy containing two or more kinds of these elements. In particular, the primary particles constituting the nanostructural substance constituted from an oxide of Ti, Fe, Ce, Zr or Al is preferred.

The crystal structure of the primary particles constituting the titanium oxide particles of the present invention may be varied depending upon the aimed applications thereof, and may be in the form of either an anatase type or a rutile type. Among them, preferred are titanium oxide particles having an anatase-type crystal structure.

The titanium oxide particles of the present invention have a BET specific surface area value of usually 50 to 6000 $m^2/g$, preferably 55 to 5500 $m^2/g$. When the BET specific surface area value of the titanium oxide particles is less than 50 $m^2/g$, the particle size of the primary particles thereof tends to be increased, so that it may be difficult to enhance a catalytic activity thereof. The titanium oxide particles having a BET specific surface area value of more than 6000 $m^2/g$ may be difficult to produce industrially.

The titanium oxide particles of the present invention preferably has a dispersed particle diameter of usually 0.05 to 20 μm, preferably 0.1 to 10 μm as measured in water by the below-mentioned method.

The titanium oxide particles of the present invention may also contain, if required, different kinds of metals in the consideration of catalytic activity and dispersibility thereof.

Next, the process for producing the nanostructural substance of the present invention is described.

The nanostructural substance of the present invention may be produced by a spray thermal decomposition method.

The "spray thermal decomposition method" means such a method in which droplets generated by spraying a raw salt solution are charged into a high-temperature field (e.g., electric furnace) to subject the droplets to drying and thermal decomposition, thereby directly and continuously producing the aimed fine particles.

Thus, the nanostructural substance of the present invention may be produced by spraying a raw material solution containing a water-soluble salt of the constitutional element of the nanostructural substance and an inorganic salt of an element other than the constitutional element of the nanostructural substance (hereinafter referred to merely as a "third inorganic salt") to generate droplets thereof, charging the droplets into a high-temperature field (e.g., electric furnace) together with a reactive gas on which the droplets are entrained to subject the droplets to drying and thermal decomposition, recovering substances thus produced, and washing the particles with water to remove the third inorganic salt solely therefrom.

Upon production of the nanostructural substance of the present invention, the third inorganic salt is added to the raw material solution in such an amount that the molar ratio of the third inorganic salt to the water-soluble salt of the constitutional element of the nanostructural substance is usually 0.5 to 6.0, preferably 1.0 to 4.0. When the molar ratio of the third inorganic salt added is more than 6.0, crystal particles of the third inorganic salt which are interspersed along a grain boundary of primary particles thus produced tends to be too large, so that the primary particles are not in a point contact with each other, thereby producing nanoparticles which act as independent particles. On the other hand, when the molar ratio of the third inorganic salt added is less than 0.5, the sintering-preventive effect thereof tends to be lowered, so that the primary particles tend to be sintered with each other, resulting in production of coarse primary particles.

The third inorganic salt used in the present invention is not particularly limited as long as the salt is a high-melting substance. In the consideration of facilitated water-washing procedure in subsequent processes, there may be used those salts whose effluent is relatively easily treated, such as sulfates and chlorides. Specific examples of the third inorganic salt may include magnesium sulfate, sodium sulfate, potassium sulfate, sodium chloride and potassium chloride.

In the present invention, as the water-soluble salt of the constitutional element of the nanostructural substance, there may be used salts having a high solubility in water such as sulfates, chlorides and nitrates. Specific examples of the water-soluble salt of the constitutional element of the nanostructural substance may include sulfates, chlorides and nitrates of Ti, Fe, Ce, Zr, Ni, Zn, Cd, Si, Mg, Al, Ca, Pd, Ag, Ba, Cu, Li, Co, La, Y, Sr, Mn, Rh, Pt, Nd, Sm, Pb, Cr, Ga and Sc.

In particular, as the water-soluble salt of titanium, there may be used those titanium salts having a high solubility in water such as sulfates, chlorides and nitrates. Specific examples of the water-soluble titanium salts may include titanium sulfate, titanium chloride or the like. Among these water-soluble titanium salts, preferred is titanium chloride.

The concentration of the water-soluble salt of the element of the nanoparticles constituting the nanostructural substance contained in the raw material solution is usually 0.01 to 5 mol/L, preferably 0.5 to 1.0 mol/L.

The reactive gas used for production of the nanostructural substance is not particularly limited, and oxidizing gases or reducing gases may be used according to the aimed substances to be produced. For example, air and hydrogen may be used as the reactive gas to produce oxides and metals, respectively.

The average diameter of the droplets when charged into the high-temperature field is usually 1 to 100 μm, preferably 1 to 10 μm.

Meanwhile, the heating temperature used in the high-temperature field is not more than the melting point of the third inorganic salt. For example, the heating temperature is usually 600 to 1200° C., preferably 700 to 1000° C.

The diameter of the primary particles constituting the nanostructural substance of the present invention may be varied by suitably controlling kind and ratio of the third inorganic salt to be added, heating temperature, etc.

The nanostructural substance may be formed into a suitable shape by controlling heating temperature, residence time within furnace, concentration of the solute and diameter of the droplets.

In the conventional spray thermal decomposition methods, the diameter of particles produced is principally determined only by the diameter of respective droplets as a starting material and the concentration of the solute contained therein. Accordingly, when nanoparticles are produced by the spray thermal decomposition methods, it is required to finely divide the starting droplets or lower the concentration of the solute.

As the techniques for finely dividing the droplets, there are known an ultrasonic spray method, etc. However, in these techniques, the reduction in diameter of the droplets is limited only to several μm. Therefore, the lowering of the solute concentration is required. Further, in any of the techniques for finely dividing the droplets, the amount of the droplets sprayed tends to be extremely small, resulting in industrially disadvantageous process.

The detailed mechanism of producing particles by the conventional spray thermal decomposition methods is as follows. That is, solute nuclei are first generated by evaporation of a solvent. In this case, in general, since the velocity of evaporation of the solvent is very high, the solute nuclei finally produced tend to become very fine, and the fine solute nuclei (crystal particles) are directly subjected to thermal decomposition. When heating and sintering processes further proceed, the solute nuclei are finally formed into spherical particles each composed of one or several crystal particles.

On the other hand, in the present invention, the above objects can be achieved by inhibiting grain growth of the fine crystal particles produced immediately after the thermal decomposition, and allowing the crystal particles to be sintered at points with each other. Further, in the present invention, since the particle diameter of the constitutional crystal particles (primary particles) does not depend at all upon the solute concentration, the concentration of the raw material solution can be increased to a higher level, so that it is expected to remarkably improve the productivity.

More specifically, by adding and mixing the third inorganic salt having no contribution to the thermal decomposition reaction of the constitutional element into the raw material solution, the third inorganic salt can be interspersed along the grain boundary of respective crystal particles upon the thermal decomposition, thereby imparting a sintering-preventive effect thereto. Meanwhile, since the water-soluble salt is selectively used as the third inorganic salt, only the third inorganic salt can be removed from the obtained particles in the subsequent water-washing step.

The thus synthesized nanoparticles are sintered at points with each other, and the thus formed nanostructural substance has a spherical shape or a thin film shape. The mechanism for synthesis of the nanostructural substance is considered by the present inventors as follows.

That is, since evaporation of the solvent is caused on the surface of the respective droplets, the concentration gradient toward a center of each droplet is produced, thereby causing a relative movement of the solvent and solute therein. When the movement of the solvent and solute is substantially balanced with the evaporation velocity of the solvent, the droplets can be fully contracted while maintaining the spherical shape of the respective starting droplets, thereby finally producing spherical particles.

On the other hand, when the evaporation velocity of the solvent is considerably large, the movement of the solvent and solute is delayed as compared with the evaporation velocity thereof, so that a dried shell is formed on the surface of each droplet and the solvent is confined within the respective droplets. When heating further proceeds, the respective droplets undergo increase in an inside pressure, and finally exploded and broken at a surface shell thereof, resulting in formation of a thin film. By selectively utilizing both of the above phenomena, the finally produced particles can be formed into either a spherical shape or a thin film shape.

Meanwhile, in the present invention, since the nanostructural substance is produced by using a high-melting substance as the third inorganic salt and controlling the treating temperature to not more than the melting point of the third inorganic salt, it is suggested that the nanostructural substance is obtained without through a molten state.

Also, the nanostructural substance of the present invention exhibits an excellent heat resistance. The nanoparticles which do not constitute the nanostructural substance are strongly agglomerated together, so that the contact area between primary particles thereof is increased. Whereas, in the nanostructural substance of the present invention, it is considered by the present inventors that the contact surface between the primary particles constituting the nanostructural substance is kept in such a state close to substantially a point contact therebetween and is very small, so that the primary particles are prevented from being sintered together due to mutual diffusion thereof at the contact surface.

Meanwhile, the nanostructural substance of the present invention may be variously changed in its shape, thereby enabling the contact condition between the nanostructural substances or the primary particles thereof as well as the heat resistance thereof to be well controlled.

That is, in the nanostructural substance of a thin film shape, it is considered that sintering of the nanostructural substance proceeds from a contact surface between the thin films. On the other hand, in the nanostructural substance of a spherical shape, it is considered that sintering thereof can be more effectively prevented since the contact surface between the spherical particles is basically small and produced only at several points. Further, in the solid nanostructural substance of a spherical shape, it is considered that the solid nanostructural substance forming a three-dimensional network structure is more readily sintered together due to an increased number of contact points per one constitutional primary particle as compared to the hollow spherical nanostructural substance forming a two-dimensional network structure.

Therefore, the shape of the nanostructural substance may be suitably varied according to the degree of the heat resistance as required. It is considered that in the applications requiring a good heat resistance, a suitable shape of the nanostructural substance is a spherical and hollow shape.

On the other hand, since the solid spherical nanostructural substance has a three-dimensional network structure constituted by primary particles thereof as described above, uniform pores are produced inside of the nanostructural substance. Therefore, the solid spherical nanostructural substance may be used as an adsorber.

In addition, the nanostructural substance of a thin film shape may be formed into a sintered body having no structural defects when being subjected to lamination, filling and heat treatment.

In particular, the titanium oxide particles having a hollow shape are prevented from being precipitated in water, and have an increased contact area with objects to be purified. Further, the hollow titanium oxide particles exhibit an excellent dispersibility, and act as a single nanostructural substance and are less agglomerated together especially in water. In addition, since the contact area between the primary particles of the titanium oxide particles is small, it becomes possible to fully exhibit properties inherent to titanium oxide. As a result, the number of the titanium oxide particles which contribute to photo-excitation is increased, and the titanium oxide particles have a high activity due to a nano-order size of the primary particles thereof, resulting in an increased rate of reaction between electrons and holes at the surface thereof. Accordingly, it is considered by the present inventors that the titanium oxide particles of the present invention can absorb and decompose the objects to be purified in an efficient manner for a short period of time.

As described above, the nanostructural substance of the present invention can be used in various applications such as catalysts, electrode materials, fillers, magnetic materials, electronic circuit devices and biological materials. Further, it is expected to use the nanostructural substance in more extensive applications by suitably selecting the shape thereof.

The nanostructural substance of the present invention has a large content of molecules located on the surface thereof as compared to simple agglomerated particles and, therefore, exhibits a high surface energy. Therefore, it is expected to exhibit the performance of the compound constituting the primary particles of the nanostructural substance to an extremely large extent. In addition, the particles constituting the nanostructural substance can be improved in handling property.

Since the primary particles constituting the nanostructural substance of the present invention have a particle diameter of not more than 30 nm, the nanostructural substance is expected to exhibit properties which are quite different from those of bulk materials.

Most of the conventional techniques for dispersing nanoparticles require the interposition of a third solid phase and, therefore, are limited in applications thereof and further very complicated in production process thereof, resulting in high production costs. On the contrary, the nanostructural substance of the present invention requires no third solid phase and can be well dispersed by sintering the thus synthesized nanoparticles in a point contact with each other.

In addition, the nanostructural substance of the present invention can be formed into either a thin film shape or a spherical shape and are, therefore, not limited in applications thereof unlike the conventional techniques.

Further, the nanostructural substance of the present invention may be readily fixed on the third solid phase, if required, without need of any particular dispersing treatment. Besides, since the production process is simple, it is expected to achieve a considerably increased productivity.

Also, the nanostructural substance of the present invention can be produced by simple spray thermal decomposition method and are, therefore, excellent in industrial productivity.

In particular, the titanium oxide particles are large in number of particles existing at the surface thereof as compared to agglomerated particles having an irregular particle configuration of nano-order size primary particles thereof. Therefore, the titanium oxide particles can exhibit a high surface activity inherent to the nanoparticles without deactivation thereof to an extremely large extent. The behavior particles of the titanium oxide particles have from a submicron-order size to several micron-order size, and, therefore, are excellent in dispersibility and handling property. Further, the titanium oxide particles of the present invention have a high catalytic activity and, therefore, can be suitably used in applications of environmental purification treatments such as purification of exhaust gases and water, deodorization, anti-fouling treatment, etc.

EXAMPLES

The present invention is described in more detail by Examples and Comparative Examples below.

(1) The average particle diameter of primary particles of the nanostructural substance was expressed by an average value of diameters of about 200 primary particles measured from an electron micrograph (TEM) thereof. The average particle diameter of the nanostructural substance was expressed by an average value of diameters of about 50 nanostructural substance particles measured from an electron micrograph (TEM) thereof.

The average particle diameter of the nanostructural substance constituting the titanium oxide particles was expressed by an average value of diameters of about 800 particles measured from an electron micrograph (SEM) thereof.

(2) The crystal structure of the nanostructural substance was identified by measuring the nanostructural substance in a diffraction angle range ($2\theta$) of 3 to 105° using a X-ray diffractometer "RINT 2200V" (tube: Cu) manufactured by Rigaku Denki Kogyo Co., Ltd.

The crystal structure of the nanostructural substance constituting the titanium oxide particles was identified by measuring the particles in a diffraction angle range (2θ) of 10 to 90° using a X-ray diffractometer "RINT 2200V" (tube: Cu) manufactured by Rigaku Denki Kogyo Co., Ltd.

(3) The crystallite size of the nanostructural substance was expressed by the value calculated from an X-ray diffraction peak curve prepared from the measured values according to the following Scherrer's formula:

Crystallite Size=$K\lambda/\beta \cos \theta$ wherein β is a true half value-width of the diffraction peak which was corrected as to the width of machine used (unit: radian); K is a Scherrer constant (=0.9); λ is a wavelength of X-ray used (Cu Kα-ray 0.1542 nm); and θ is a diffraction angle (corresponding to diffraction peak of each crystal plane).

(4) The specific surface area of the nanostructural substance was expressed by the value measured by BET method.

The heat resistance of the nanostructural substance was evaluated by the change in specific surface area value of particles to be evaluated when allowing the particles to stand for about 24 hours in an electric furnace which temperature was set to about 1000° C.

(5) The behavior of the titanium oxide particles in a liquid phase was measured using "HELOS SYSTEM PARTICLE SIZE ANALYZER" (hereinafter referred to merely as "HELOS") manufactured by JEOL Co., Ltd., after irradiating an ultrasonic wave to a sample dispersion whose concentration was adjusted to 10% using pure water as a dispersing medium, for 300 s.

Example 1

0.2 mol/L of zirconium oxynitrate and 0.4 mol/L of magnesium sulfate were respectively dissolved in water, and the resultant solutions were sprayed through a two fluid nozzle and entrained on air, and then supplied to a heating furnace. The particles discharged from the heating furnace were collected and recovered by a bag filter. Thereafter, the thus recovered particles were subjected to ultrasonic washing and centrifugal separation washing, and then dried.

Meanwhile, as the heating furnace, there was used a tubular furnace of a resistance heating type, and as a core tube, there was used a ceramic tube having an inner diameter (D) of 70 mm and an effective length (L) of 1800 mm. The temperature of the heating furnace was adjusted to 1000° C. Meanwhile, the total flow rate of air used was 40 NL/min.

Figure 2:
FIG. 2 is a scanning electron micrograph showing a particle shape of a hollow nanostructural substance obtained in Example 1 (magnification: ×100000).

As a result, it was confirmed that the obtained nanostructural substance was made of $ZrO_2$, the average particle diameter of primary particles thereof was 8.0 nm as calculated from results of measurement by an electron microscope, the crystallite size thereof was 8.5 nm as calculated from results of X-ray diffraction analysis, and the ratio of the diameter of primary particles as calculated from results of measurement by an electron microscope to the crystallite size as calculated from results of X-ray diffraction analysis was 0.94. Since the diameter of primary particles was substantially identical to the crystallite size, it was suggested that the primary particles were in the form of a single crystal. Further, it was confirmed that the average particle diameter of the nanostructural substance was 0.80 μm. The results of measurements using the electron microscope are shown in FIGS. 1 and 2. As apparent from FIGS. 1 and 2, it was confirmed that the thus obtained nanostructural substance exhibited a hollow spherical shape, and had a BET specific surface area of 110.0 m²/g.

Example 2

The same procedure as defined in Example 1 was conducted except that 0.2 mol/L of cerium nitrate and 0.4 mol/L of magnesium sulfate were used as the raw salts, thereby obtaining a nanostructural substance.

As a result, it was confirmed that the thus obtained nanostructural substance was made of $CeO_2$, the average particle diameter of primary particles thereof was 10.5 nm as calculated from results of measurement by an electron microscope, and the crystallite size thereof was 10.0 nm as calculated from results of X-ray diffraction analysis. Therefore, it was suggested that the primary particles were in the form of a single crystal. Further, it was confirmed that the average particle diameter of the nanostructural substance was 1.1 μm. As a result of measurements using the electron microscope, it was confirmed that the thus obtained nanostructural substance exhibited a hollow spherical shape, and had a BET specific surface area of 60 m²/g.

Example 3

The same procedure as defined in Example 1 was conducted except that 0.3 mol/L of each of titanium tetrachloride and sodium sulfate was dissolved in water to prepare raw material solutions, and the heating temperature was adjusted to 800° C., thereby obtaining a nanostructural substance.

As a result, it was confirmed that the thus obtained nanostructural substance was made of $TiO_2$, the average particle diameter of primary particles thereof was 11.2 nm as calculated from results of measurement by an electron microscope, and the crystallite size thereof was 10.5 nm as calculated from results of X-ray diffraction analysis. Therefore, it was suggested that the primary particles were in the form of a single crystal. Further, it was confirmed that the average particle diameter of the nanostructural substance was 0.7 μm. As a result of measurements using the electron microscope, it was confirmed that the thus obtained nanostructural substance exhibited a hollow spherical shape, and had a BET specific surface area of 151 m²/g.

Example 4

The same procedure as defined in Example 1 was conducted except that 0.2 mol/L of iron nitrate and 0.3 mol/L of sodium sulfate were respectively dissolved in water to prepare raw material solutions, and the heating temperature was adjusted to 800° C., thereby obtaining a nanostructural substance.

Figure 3:
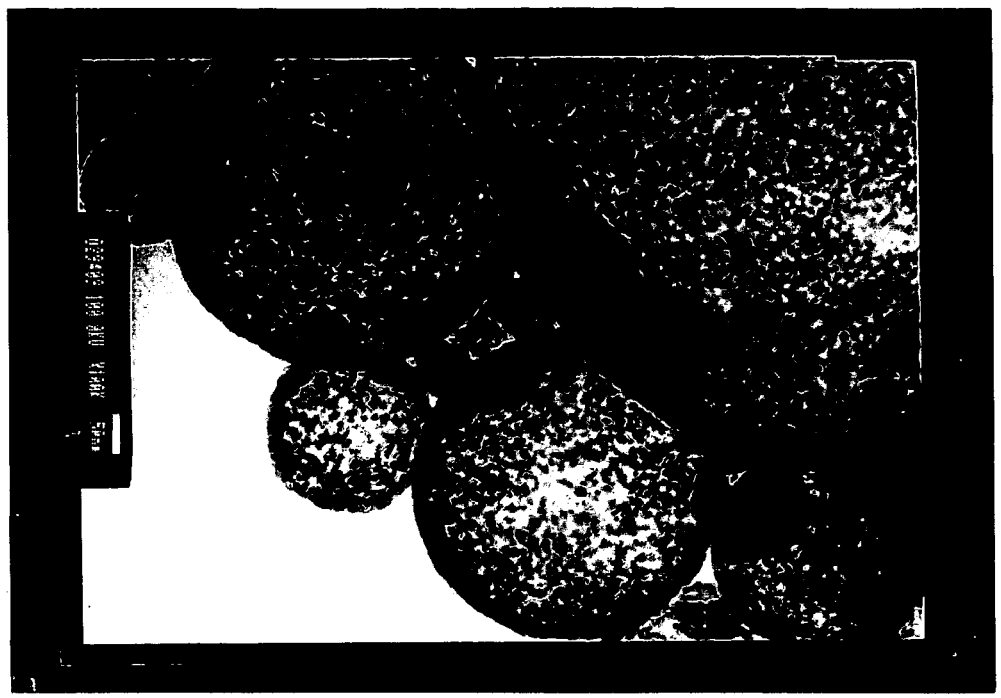
FIG. 3 is a scanning electron micrograph showing a particle shape of a hollow nanostructural substance obtained in Example 4 (magnification: ×100000).

As a result, it was confirmed that the thus obtained nanostructural substance was made of $Fe_2O_3$, the average particle diameter of primary particles thereof was 12.5 nm as calculated from results of measurement by an electron microscope, and the crystallite size thereof was 13.5 nm as calculated from results of X-ray diffraction analysis. Therefore, it was suggested that the primary particles were in the form of a single crystal. Further, it was confirmed that the average particle diameter of the nanostructural substance was 1.3 μm. The results of measurements using the electron microscope are shown in FIG. 3. As apparent from FIG. 3, it was confirmed that the thus obtained nanostructural substance exhibited a hollow spherical shape, and had a BET specific surface area of 89 m²/g.

Example 5

The same procedure as defined in Example 1 was conducted except that 0.1 mol/L of zirconium oxynitrate and 0.4 mol/L of magnesium sulfate were respectively dissolved in water to prepare raw material solutions, and the heating temperature was adjusted to 1000° C., thereby obtaining a nanostructural substance.

Figure 4:
FIG. 4 is a scanning electron micrograph showing a particle shape of a solid nanostructural substance obtained in Example 5 (magnification: ×50000).
Figure 5:
FIG. 5 is a scanning electron micrograph showing a particle shape of a solid nanostructural substance obtained in Example 5 (magnification: ×100000).

As a result, it was confirmed that the thus obtained nanostructural substance was made of $ZrO_2$, the average particle diameter of primary particles thereof was 8.0 nm as calculated from results of measurement by an electron microscope, and the crystallite size thereof was 8.5 nm as calculated from results of X-ray diffraction analysis. Therefore, it was suggested that the primary particles were in the form of a single crystal. Further, it was confirmed that the average particle diameter of the nanostructural substance was 0.5 μm. The results of measurements using the electron microscope are shown in FIGS. 4 and 5. As apparent from FIGS. 4 and 5, it was confirmed that the thus obtained nanostructural substance exhibited a solid spherical shape, and had a BET specific surface area of 105 $m^2/g$.

Example 6

The same procedure as defined in Example 1 was conducted except that 0.01 mol/L of zirconium oxynitrate and 0.02 mol/L of magnesium sulfate were respectively dissolved in water to prepare raw material solutions, and the heating temperature was adjusted to 1000° C., thereby obtaining a nanostructural substance.

Figure 6:
FIG. 6 is a scanning electron micrograph showing a particle shape of a thin film-shaped nanostructural substance obtained in Example 6 (magnification: ×25000).

As a result, it was confirmed that the thus obtained nanostructural substance was made of $ZrO_2$, the average particle diameter of primary particles thereof was 8.0 nm as calculated from results of measurement by an electron microscope, and the crystallite size thereof was 8.5 nm as calculated from results of X-ray diffraction analysis. Therefore, it was suggested that the primary particles were in the form of a single crystal. The results of measurements using the electron microscope are shown in FIG. 6. As apparent from FIG. 6, it was confirmed that the thus obtained nanostructural substance exhibited a thin film shape, and had a BET specific surface area of 107 $m^2/g$.

Example 7

The same procedure as defined in Example 1 was conducted except that 0.3 mol/L of aluminum nitrate and 0.65 mol/L of sodium sulfate were respectively dissolved in water to prepare raw material solutions, and the heating temperature was adjusted to 900° C., thereby obtaining a nanostructural substance.

Figure 7:
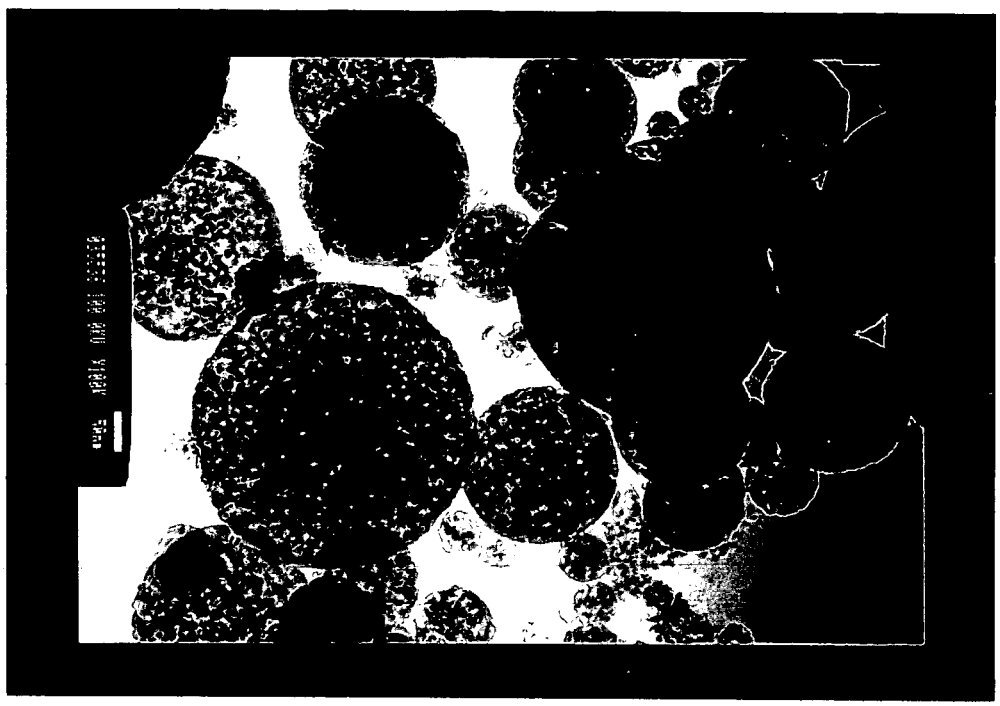
FIG. 7 is a scanning electron micrograph showing a particle shape of a hollow nanostructural substance obtained in Example 7 (magnification: ×100000).

As a result, it was confirmed that the thus obtained nanostructural substance was made of $Al_2O_3$, the average particle diameter of primary particles thereof was 7.5 nm as calculated from results of measurement by an electron microscope, and the crystallite size thereof was 6.1 nm as calculated from results of X-ray diffraction analysis. Therefore, it was suggested that the primary particles were in the form of a single crystal. The results of measurements using the electron microscope are shown in FIG. 7. As apparent from FIG. 7, it was confirmed that the thus obtained nanostructural substance exhibited a hollow shape, and had an average particle diameter of 0.6 μm and a BET specific surface area of 240 $m^2/g$.

However, in the nanostructural substance obtained in this Example, a solid solution with the third inorganic salt partially remained. Consequently, when it is required to produce a nanostructural substance having a higher purity, such a high-purity nanostructural substance can be obtained by subjecting the above nanostructural substance to thermal decomposition while suitably adjusting the heating temperature to produce particles having a different crystal structure such as amorphous state, washing the thus produced particles, and then subjecting the particles again to heating treatment using an ordinary stationary furnace, etc.

Comparative Example 1

The same procedure as defined in Example 1 was conducted except that 0.1 mol/L of zirconium oxynitrate and 0.8 mol/L of magnesium sulfate were respectively dissolved in water to prepare raw material solutions, and the heating temperature was adjusted to 1000° C., thereby obtaining nano-order particles having no specified structure.

Figure 8:
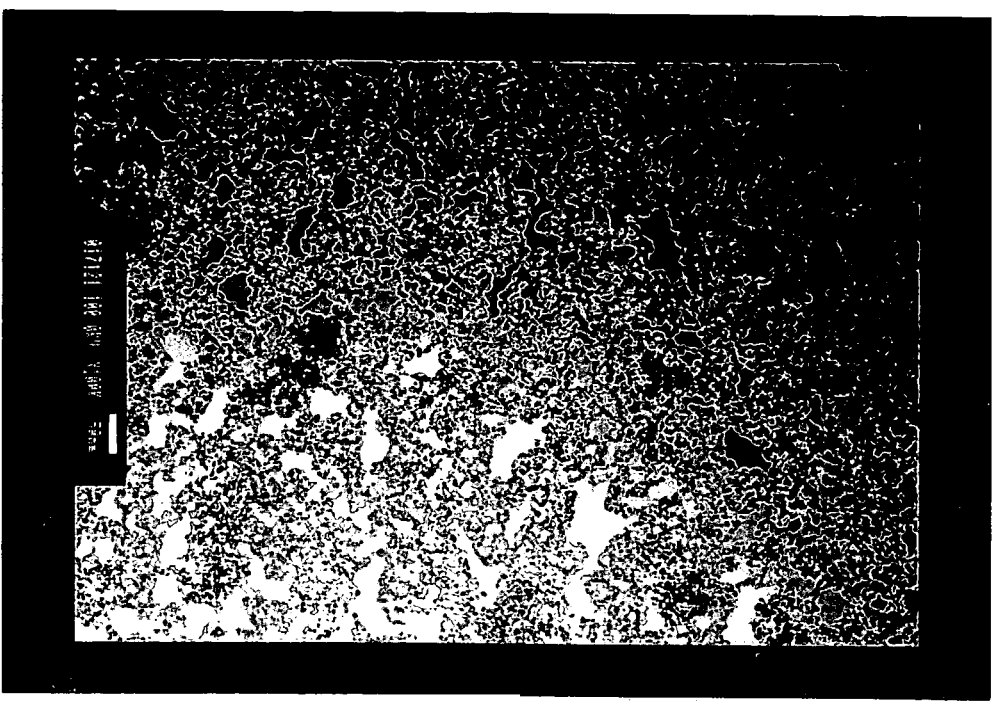
FIG. 8 is a scanning electron micrograph showing a particle shape of nanoparticles obtained in Comparative Example 1 (magnification: ×100000).

As a result, it was confirmed that the thus obtained nano-order particles having no specified structure was made of $ZrO_2$, the average particle diameter of primary particles thereof was 8.0 nm as calculated from results of measurement by an electron microscope, and the crystallite size thereof was 8.5 nm as calculated from results of X-ray diffraction analysis. Therefore, it was suggested that the primary particles were in the form of a single crystal. The results of measurements using the electron microscope are shown in FIG. 8. As apparent from FIG. 8, it was confirmed that the primary particles were independently present and, therefore, formed no nanostructural substance, and further had a BET specific surface area of 103 $m^2/g$.

Various properties of the particles obtained in the above Examples and Comparative Examples are shown in Table 1.

In addition, as apparent from FIGS. 1 to 7, it was confirmed that pores (voids) were present between the primary particles constituting the nanostructural substance.

Meanwhile, as a result of subjecting the particles obtained in Examples 1 to 7 and Comparative Example 1 to X-ray diffraction analysis for identifying a crystal structure thereof, it was confirmed that the particles were respectively made of the aimed oxides.

Further, it was confirmed that the BET specific surface area values of the particles obtained in Examples 1, 5 and 6 and Comparative Example 1 were substantially identical to each other, and the primary particles thereof were all made of $ZrO_2$ and had substantially the same average particle diameter of about 8.0 nm. Although the particles obtained in Examples 1, 5 and 6 were nanostructural substances of various shapes, the BET specific surface areas thereof was substantially identical to that of the particles obtained in Comparative Example 1. Accordingly, it was suggested that in the respective nanostructural substances obtained in the Examples, a contact area and a sintered surface between primary particles thereof were small, and the sintering between the primary particles was caused substantially at points.

Further, when the nanostructural substances obtained in Examples 1, 5 and 6 were compared with the nanoparticles obtained in Comparative Example 1 for evaluating the heat resistance thereof, it was apparently recognized that the degree of reduction in BET specific surface of the nanostructural substances obtained in these Examples was small, and, therefore, the nanostructural substances were excellent in heat resistance.

In addition, it was confirmed that among the nanostructural substances obtained in Examples 1, 5 and 6, the nanostructural substance obtained in Example 1 which had a hollow spherical shape was most excellent in heat resistance, and the nanostructural substances obtained in Examples 5 and 6 which respectively had a solid spherical shape and a thin film shape were successively decreased in heat resistance.

Example 8

0.15 mol/L of titanium tetrachloride and 0.3 mol/L of sodium sulfate were respectively dissolved in water to prepare raw material solutions. The resultant raw material solutions were sprayed through a two fluid nozzle and entrained on air, and then supplied to a heating furnace. The particles discharged from the heating furnace were collected and recovered by a bag filter. Thereafter, the thus recovered particles were subjected to ultrasonic washing and centrifugal separation washing, and then dried.

Meanwhile, as the heating furnace, there was used a tubular furnace of a resistance heating type, and as a core tube, there was used a ceramic tube having an inner diameter (D) of 70 mm and an effective length (L) of 1800 mm. The temperature of the heating furnace was adjusted to 700° C. Meanwhile, the total flow rate of air used was 40 NL/min.

Figure 9:
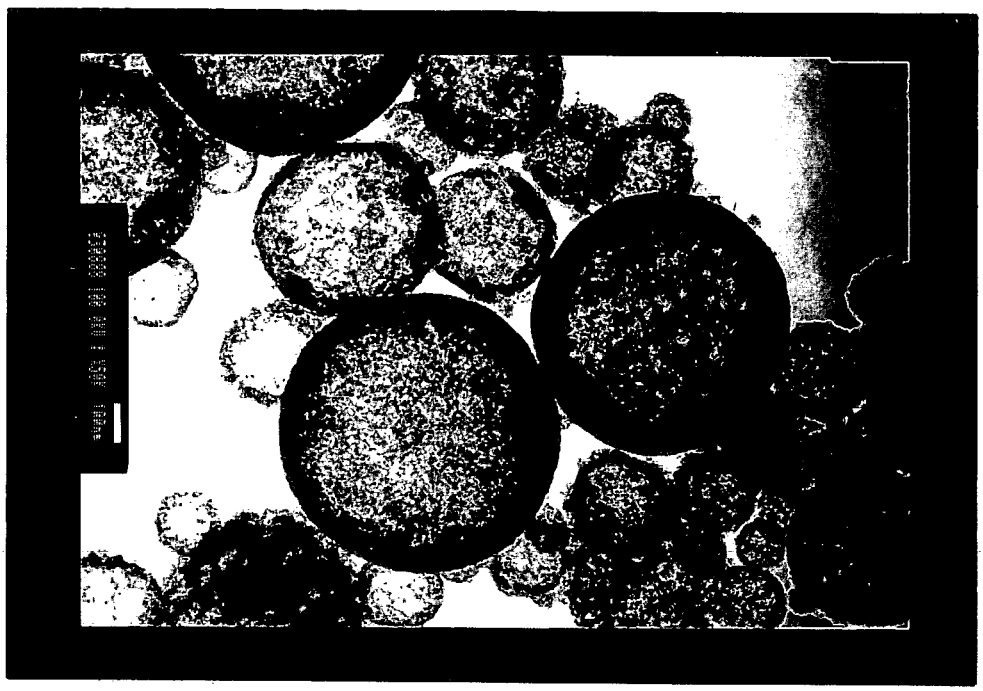
FIG. 9 is a scanning electron micrograph showing a particle shape of titanium oxide particles obtained in Example 8 (magnification: ×50000).
Figure 10:
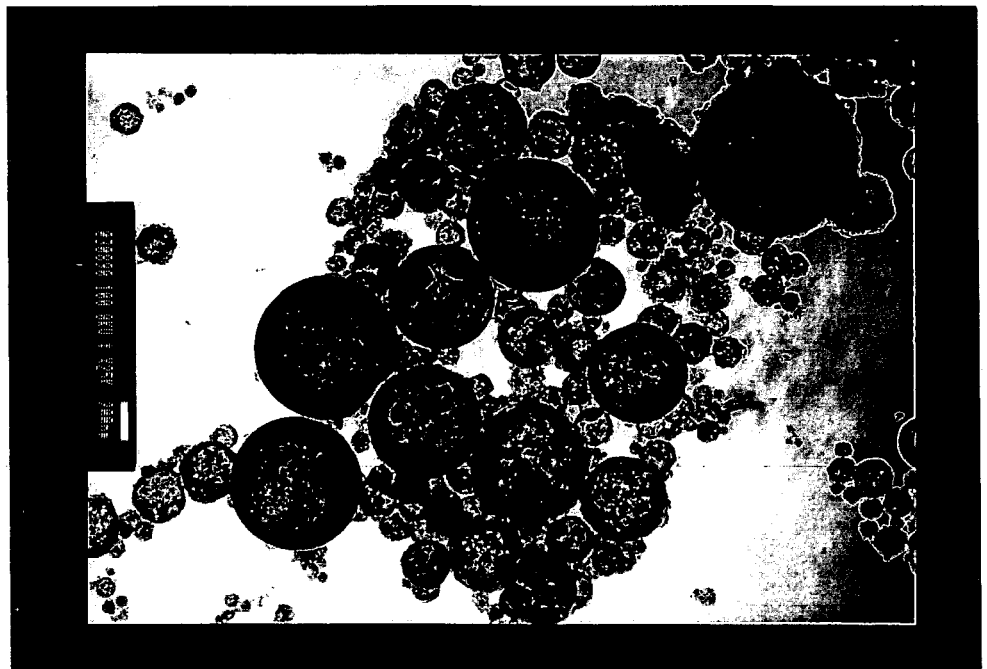
FIG. 10 is a scanning electron micrograph showing a particle shape of titanium oxide particles obtained in Example 8 (magnification: ×25000).

As a result, it was confirmed that the obtained nanostructural substance was made of $TiO_2$ and had an anatase crystal structure, the average particle diameter of primary particles thereof was 6.6 nm as calculated from results of measurement by an electron microscope, and the crystallite size thereof was 6.7 nm as calculated from results of X-ray diffraction analysis. Therefore, it was suggested that the primary particles were substantially in the form of a single crystal. The results of measurements using the electron microscope are shown in FIGS. 9 and 10. As apparent from FIGS. 9 and 10, it was confirmed that the thus obtained nanostructural substance exhibited a hollow spherical shape, and pores (voids) were present between the primary particles constituting the nanostructural substance. Further, it was confirmed that the nanostructural substance had an average particle diameter of 0.46 μm (as measured by SEM) and a BET specific surface area of 160 $m^2$/g.

Figure 11:
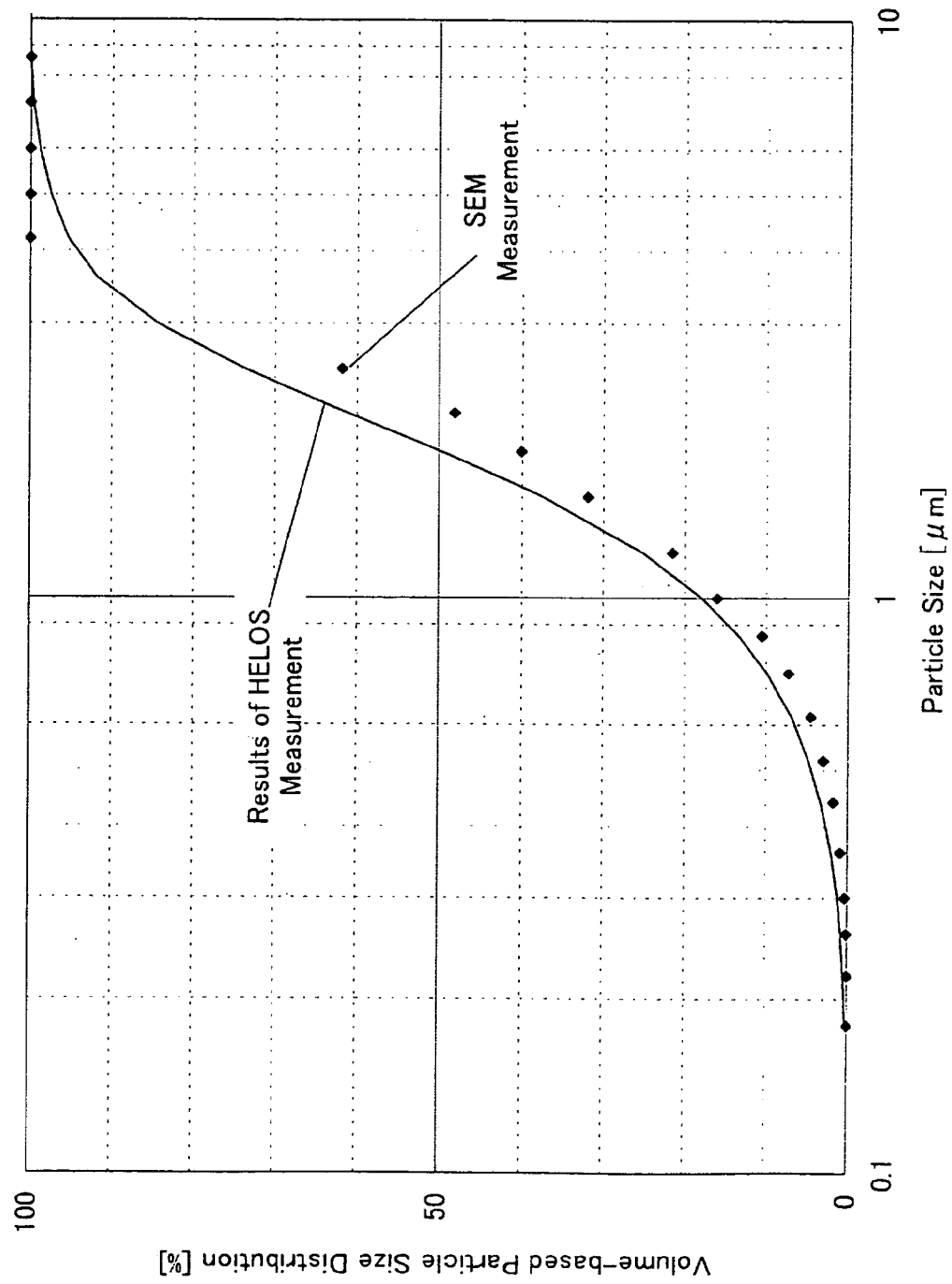
FIG. 11 is a graph showing a water-dispersed condition (based on volume) of titanium oxide particles obtained in Example 8 as well as a particle size distribution thereof (based on volume) determined by SEM.

The dispersing condition of the obtained titanium oxide particles in water is shown in FIG. 11. It was confirmed that the average particle diameter of the titanium oxide particles as measured by HELOS was 0.40 μm and substantially identical to the particle diameter as measured by SEM. As a result, it was suggested that the obtained titanium oxide particles were present in water substantially in a monodisperse state.

Example 9

0.15 mol/L of titanium tetrachloride and 0.3 mol/L of sodium sulfate were respectively dissolved in water to prepare raw material solutions. The resultant raw material solutions were sprayed through a two fluid nozzle and entrained on air, and then supplied to a heating furnace. The particles discharged from the heating furnace were collected and recovered by a bag filter. Thereafter, the thus recovered particles were subjected to ultrasonic washing and centrifugal separation washing, and then dried.

Meanwhile, as the heating furnace, there was used a tubular furnace of a resistance heating type, and as a core tube, there was used a ceramic tube having an inner diameter (D) of 70 mm and an effective length (L) of 1800 mm. The temperature of the heating furnace was adjusted to 600° C. Meanwhile, the total flow rate of air used was 40 NL/min.

Figure 12:
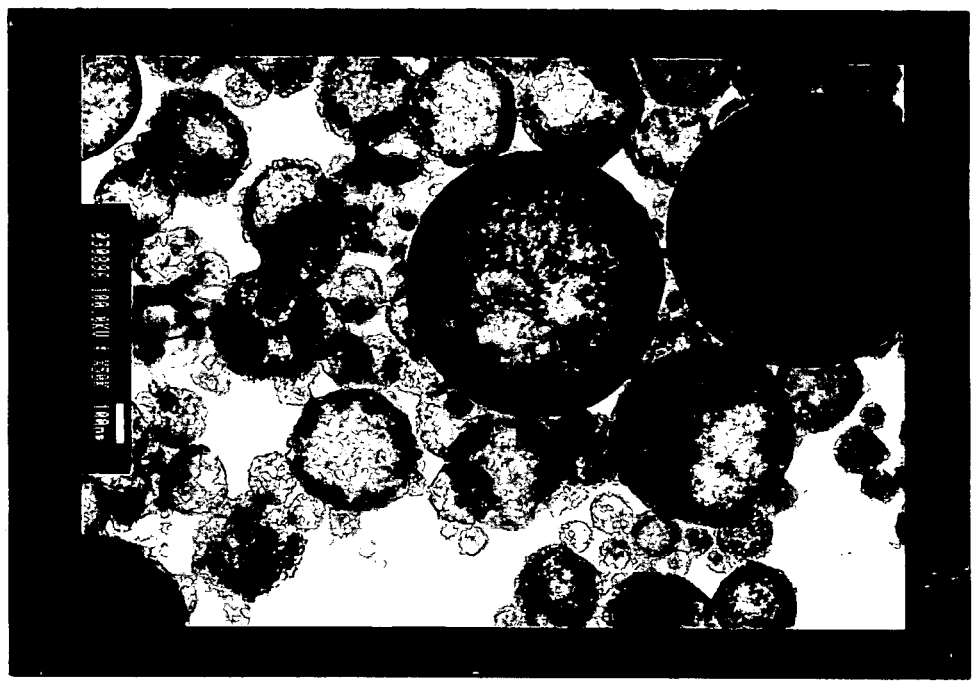
FIG. 12 is a scanning electron micrograph showing a particle shape of titanium oxide particles obtained in Example 9 (magnification: ×50000).

As a result, it was confirmed that the obtained nanostructural substance was made of $TiO_2$ and had an anatase crystal structure, the average particle diameter of primary particles thereof was 5.0 nm as calculated from results of measurement by an electron microscope, and the crystallite size thereof was 4.4 nm as calculated from results of X-ray diffraction analysis. Therefore, it was suggested that the primary particles were substantially in the form of a single crystal. The results of measurements using the electron microscope are shown in FIG. 12. As apparent from FIG. 12, it was confirmed that the thus obtained nanostructural substance exhibited a hollow spherical shape, and pores (voids) were present between the primary particles constituting the nanostructural substance. Further, it was confirmed that the nanostructural substance had an average particle diameter of 0.52 μm (as measured by SEM) and a BET specific surface area of 202 $m^2$/g.

Figure 13:
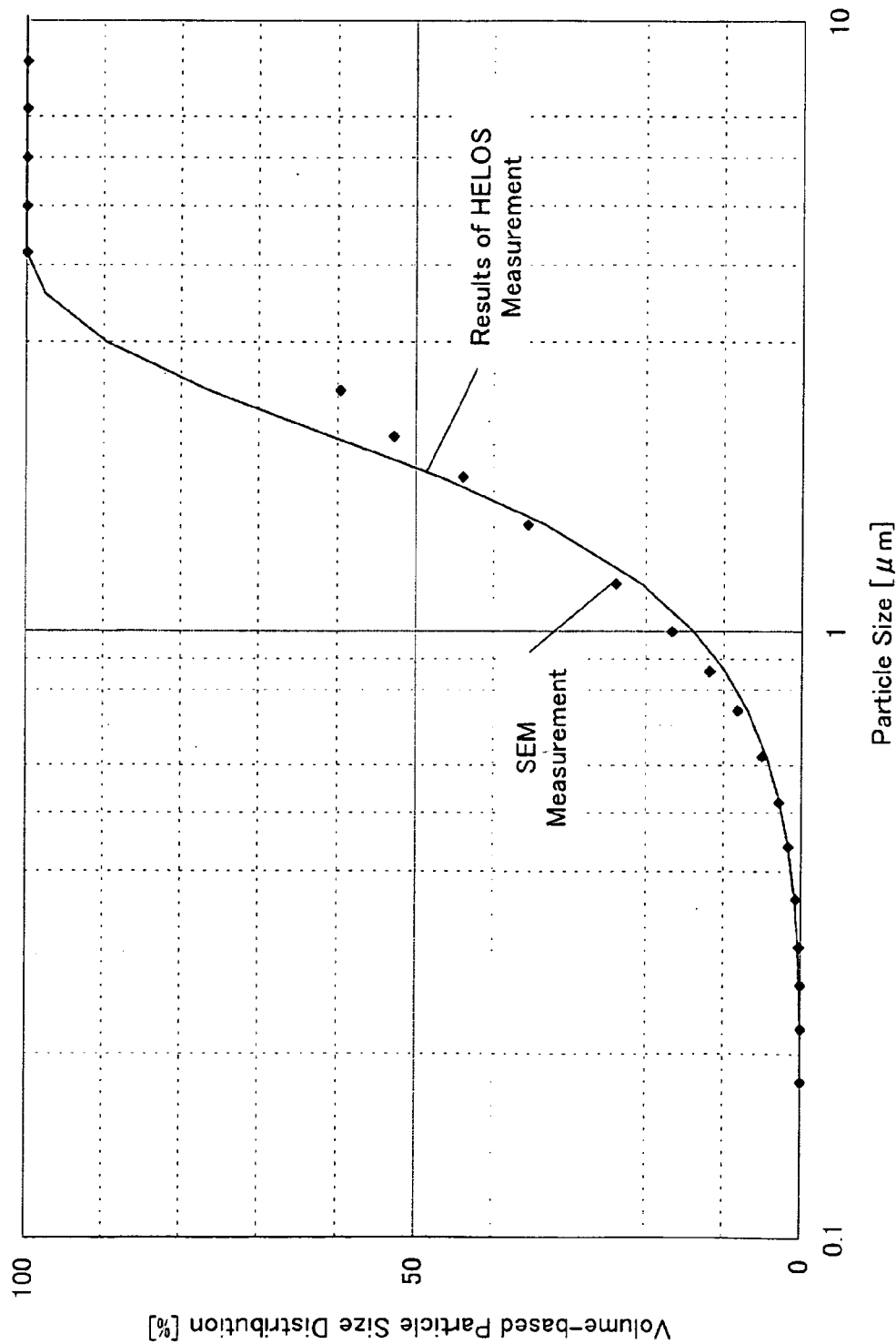
FIG. 13 is a graph showing a water-dispersed condition (based on volume) of titanium oxide particles obtained in Example 9 as well as a particle size distribution thereof (based on volume) determined by SEM.

The dispersing condition of the obtained titanium oxide particles in water is shown in FIG. 13. It was confirmed that the average particle diameter of the titanium oxide particles as measured by HELOS was 0.50 μm and substantially identical to the particle diameter as measured by SEM. As a result, it was suggested that the obtained titanium oxide particles were present in water substantially in a monodisperse state of the nanostructural substance.

Comparative Example 2

As particles to be tested, there was used "ST-01" produced by Ishihara Sangyo Co., Ltd.

Figure 14:
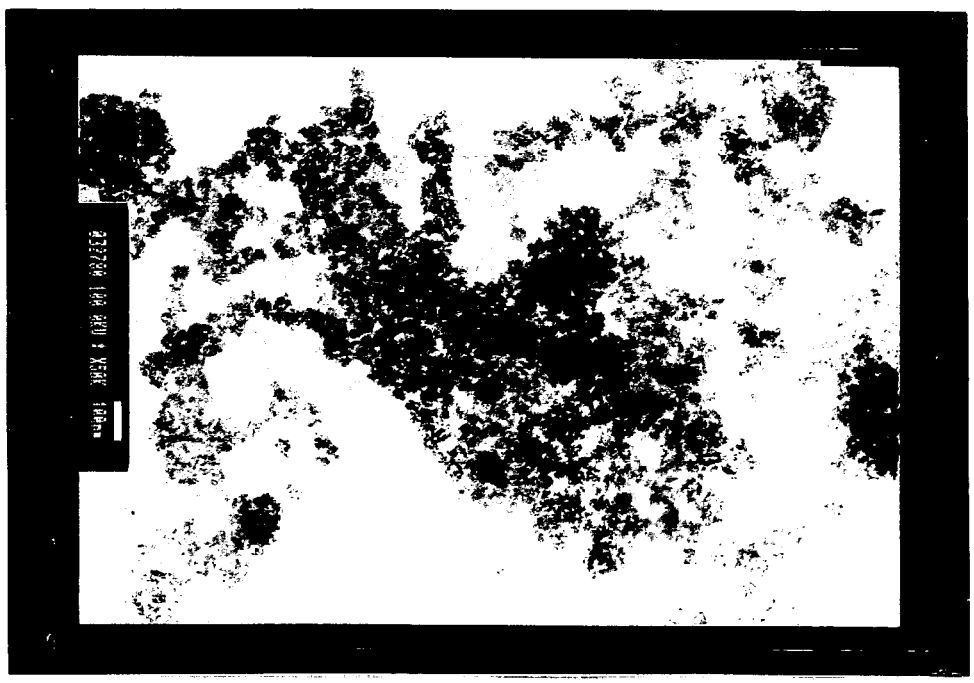
FIG. 14 is a scanning electron micrograph showing a particle shape of titanium oxide particles obtained in Comparative Example 2 (magnification: ×50000).
Figure 15:
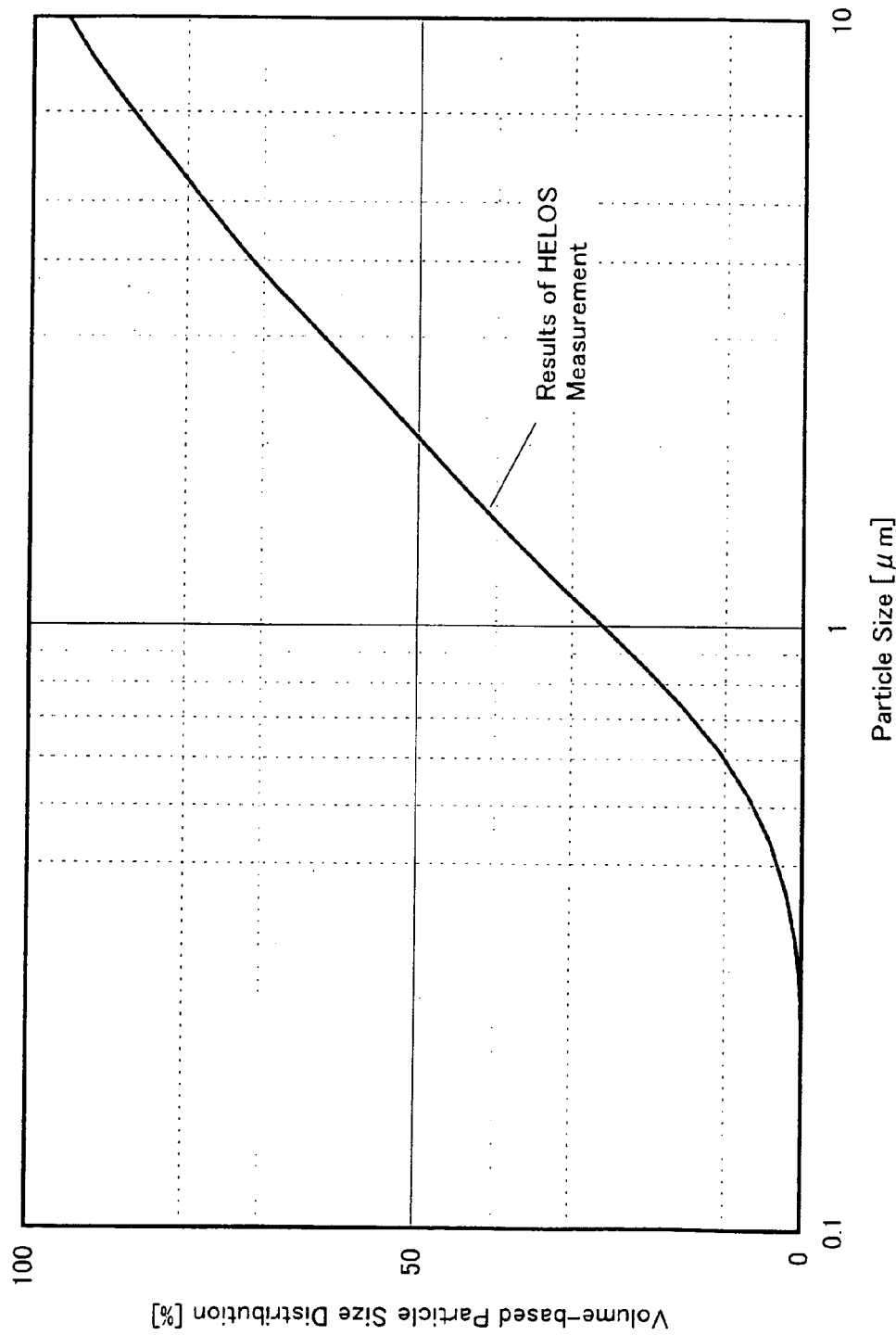
FIG. 15 is a graph showing a water-dispersed condition (based on volume) of titanium oxide particles obtained in Comparative Example 2.

It was confirmed that the average particle diameter of primary particles of "ST-01" was 5.3 nm as calculated from results of measurement by an electron microscope, and the crystallite size thereof was 4.7 nm as calculated from results of X-ray diffraction analysis. Therefore, it was suggested that the primary particles of "ST-01" were substantially in the form of a single crystal. The results of measurements using the electron microscope are shown in FIG. 14. As apparent from FIG. 14, it was confirmed that "ST-01" was composed of an agglomerate of nanoparticles, and had an anatase crystal structure and a BET specific surface area of 328 $m^2$/g. The dispersing condition of "ST-01" in water is shown in FIG. 15.

Various properties of the particles obtained in Examples 8 and 9 and Comparative Example 2 are shown in Table 2.

<Evaluation for Purification Treatment of Water>

The photocatalytic activity of the titanium oxide particles obtained in Examples 8 and 9 and Comparative Example 2 was evaluated by a decoloring performance thereof when treated an aqueous methylene blue solution (MB solution) therewith.

More specifically, 40 g of a 100 ppm MB solution and 0.1 g of sample particles were placed within a glass container, and irradiated with black light (UV: 1 mW/$cm^2$) while stirring at 20 rpm using a mixing rotor to excite the photocatalytic reaction. UV was irradiated for 1, 2, 4 and 24 hours, respectively, and the contents of the glass container was sampled with the passage of time and subjected to solid-liquid separation. Thereafter, the change in absorbance of blueness of the thus separated MB solution with the passage of time was measured using a spectrophotometer "SHIMADZU SELF-RECORDING SPECTROPHOTOMETER UV-2100" manufactured by Shimadzu Seisakusho Co., Ltd.

Meanwhile, methylene blue undergoes substantially no decomposition by irradiation of black light UV used, and is decomposed by a photocatalytic effect and changed from blue to colorless liquid. Therefore, methylene blue has been extensively used for evaluation of a photocatalytic activity.

Figure 16:
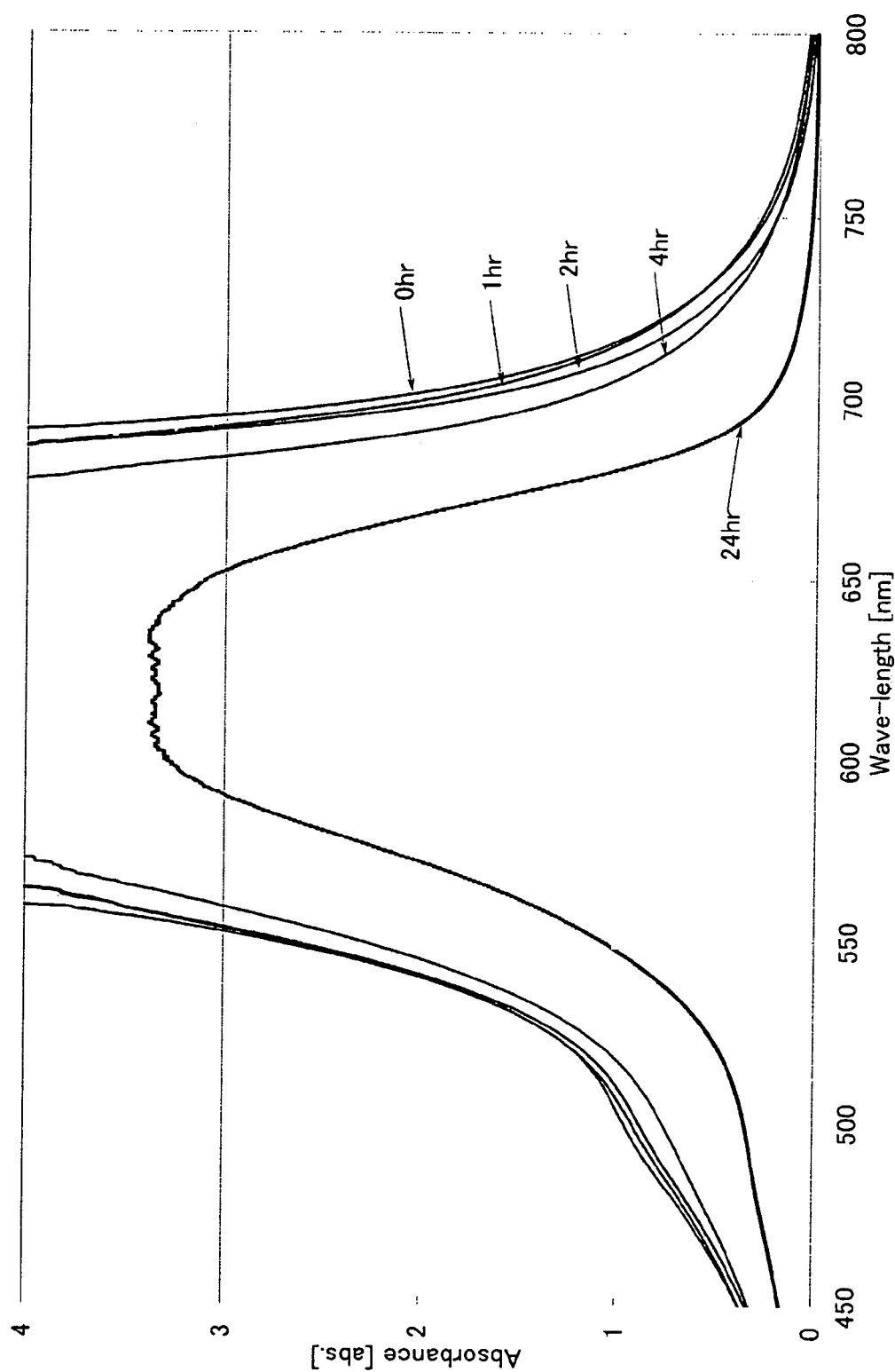
FIG. 16 is a graph showing results of performance evaluation of a photocatalyst made of titanium oxide particles obtained in Example 8.
Figure 17:
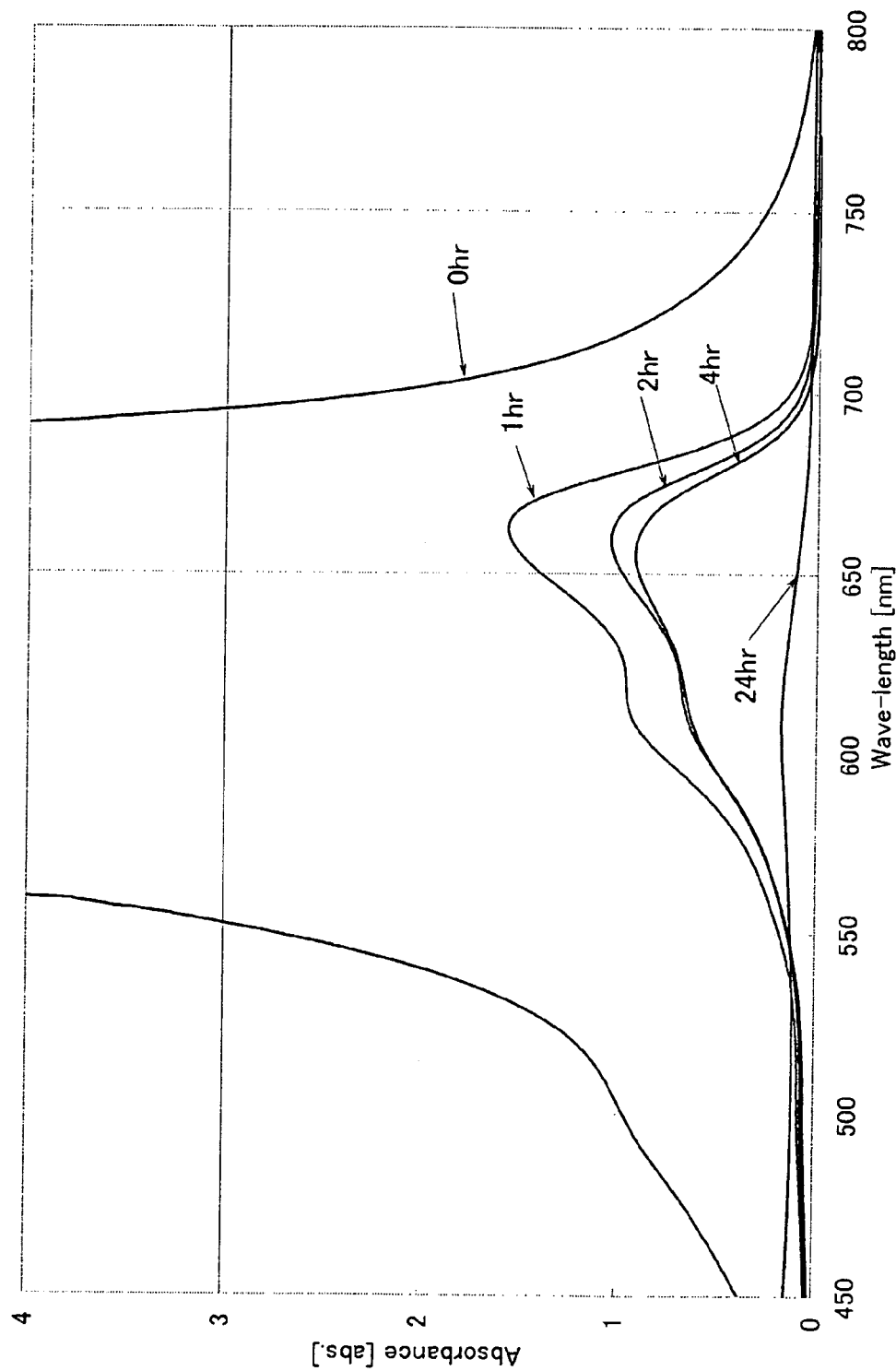
FIG. 17 is a graph showing results of performance evaluation of a photocatalyst made of titanium oxide particles obtained in Example 9.
Figure 18:
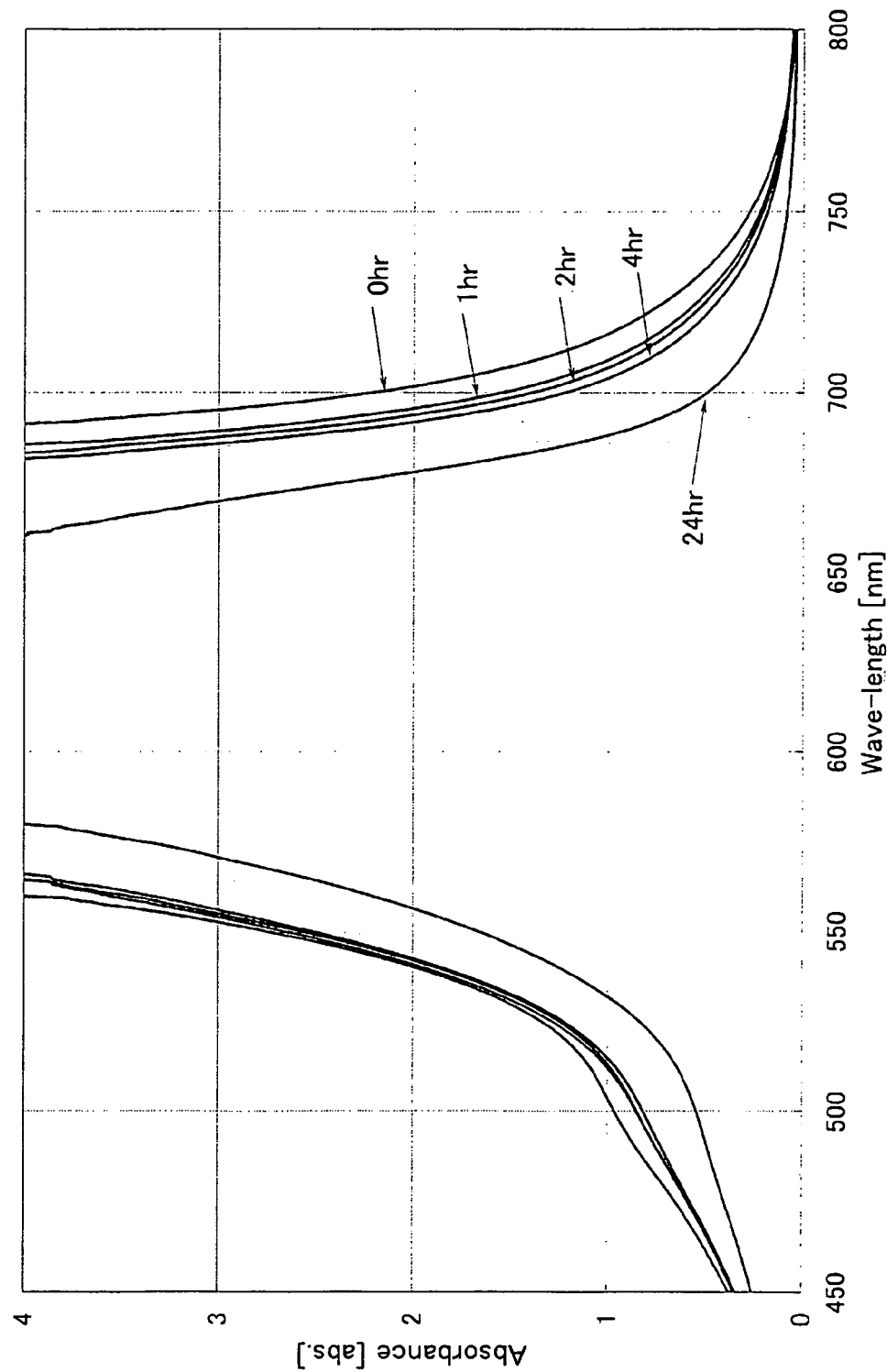
FIG. 18 is a graph showing results of performance evaluation of a photocatalyst made of titanium oxide particles obtained in Comparative Example 2.

The results of evaluation for photocatalytic activity of the titanium oxide particles obtained in Examples 8 and 9 and Comparative Example 2 are shown in FIGS. 16, 17 and 18, respectively. As a result, it was confirmed that the photocatalytic activity of the titanium oxide particles according to the present invention was more excellent as compared to that of Comparative Example 2. Also, in Examples 8 and 9, it was recognized that the photocatalytic activity of the titanium oxide particles was increased with increase of the specific surface area thereof.

In this regard, it is considered that the photocatalytic activity of the titanium oxide particles was largely influenced by a particle configuration thereof as well as a dispersed condition thereof in water as shown in FIGS. 11, 13 and 15. As a result of the measurements by TEM, HELOS and SEM, it was suggested that behavior particles of Examples 8 and 9 in water were hollow spherical particles, whereas those of Comparative Example 2 were agglomerated particles.

The photocatalytic reaction is such a reaction caused only on the light-irradiated surface of the titanium oxide particles. In Examples 8 and 9, it is considered that since the methylene blue solution was penetrated up to an inside of the spherical particles owing to a hollow shape thereof, and further the particles were kept substantially in a monodisperse state in water as recognized from the results of measurements by SEM and HELOS, the inner and outer surfaces of the particles were efficiently utilized in the photocatalytic reaction without deactivation of the surface activity inherent to nanoparticles.

On the other hand, in Comparative Example 2, since the particles obtained therein were agglomerated particles despite a very large specific surface area thereof, it may be difficult to cause the methylene blue solution to penetrate up to an inside of the agglomerated particles. As a result, it is considered that the photocatalytic reaction was caused only on the surface of the agglomerated particles, and the particles present within the agglomerated particles failed to contribute to the photocatalytic reaction, so that properties of the nanoparticles were not fully exhibited.

In particular, the titanium oxide particles of the present invention exhibit a high catalytic activity and an excellent dispersibility and, therefore, can be suitably used as a photocatalyst.

Further, when the titanium oxide particles of the present invention are used as the photocatalyst, there is required the procedure for separating the resultant reaction mixture into the reaction product and the catalyst. For example, when applied to purification of water, fine particles tend to be discharged together with the purified water, so that it is required to change the configuration into fixed bed, films, etc. The titanium oxide particles of the present invention can be readily handled owing to large behavior particles thereof and, therefore, readily applied to conventional apparatuses.

TABLE 1

| Examples and Comparative Examples | Substance produced | Shape of nanostructural substance | Particle diameter of nanostructural substance (μm) |
|---|---|---|---|
| Example 1 | $ZrO_2$ | Hollow spherical shape | 0.8 |
| Example 2 | $CeO_2$ | Hollow spherical shape | 1.1 |
| Example 3 | $TiO_2$ | Hollow spherical shape | 0.7 |
| Example 4 | $Fe_2O_3$ | Hollow spherical shape | 1.3 |
| Example 5 | $ZrO_2$ | Solid spherical shape | 0.5 |
| Example 6 | $ZrO_2$ | Thin film shape | — |
| Example 7 | $Al_2O_3$ | Hollow spherical shape | 0.6 |
| Comparative Example 1 | $ZrO_2$ | Not formed (simple nanoparticles) | |

| Examples and Comparative Examples | Primary particle diameter | | A/B (—) |
|---|---|---|---|
| | As calculated from results of measurement by electron microscope [A] (nm) | As calculated from results of X-ray diffraction analysis [B] (nm) | |
| Example 1 | 8.0 | 8.0 | 0.94 |
| Example 2 | 10.5 | 10.0 | 1.05 |
| Example 3 | 11.2 | 10.5 | 1.07 |
| Example 4 | 12.5 | 13.5 | 0.93 |
| Example 5 | 8.0 | 8.5 | 0.94 |
| Example 6 | 8.0 | 8.5 | 0.94 |
| Example 7 | 7.5 | 6.1 | 1.23 |
| Comparative Example 1 | 8.0 | 8.5 | 0.94 |

| Examples and Comparative Examples | BET specific surface area ($m^2/g$) | Heat resistance Specific surface area after heat-treatment ($m^2/g$) |
|---|---|---|
| Example 1 | 110 | 16 |
| Example 2 | 60 | 8 |
| Example 3 | 151 | 22 |
| Example 4 | 89 | 13 |
| Example 5 | 105 | 12 |
| Example 6 | 107 | 8 |
| Example 7 | 240 | 105 |
| Comparative Example 1 | 103 | 3 |

TABLE 2

Properties of titanium oxide particles

| Examples and Comparative Examples | Crystal system (—) | Particle configuration (—) | Primary particles | |
|---|---|---|---|---|
| | | | Average primary particle diameter (by TEM) (nm) | Crystallite size (nm) |
| Example 8 | Anatase | Nanostructural substance | 6.6 | 6.7 |
| Example 9 | Anatase | Nanostructural substance | 5.0 | 4.4 |
| Comparative Example 2 | Anatase | Agglomerate | 5.3 | 4.7 |

Properties of titanium oxide particles

| Examples and Comparative Examples | Nanostructural substance | | |
|---|---|---|---|
| | Particle diameter by SEM (μm) | Particle diameter by HELOS (μm) | Specific surface area ($m^2/g$) |
| Example 8 | 0.46 | 0.40 | 160 |
| Example 9 | 0.52 | 0.50 | 202 |
| Comparative Example 2 | — | — | 328 |

What is claimed is:

1. A method of producing a nanostructural substance comprising a thin film-shaped material or a spherical-shaped material by spray thermal decomposition, the method comprising the steps of:
   (a) spraying to form droplets of a solution of (1) a water-soluble salt of at least one element selected from the group consisting of Ti, Fe, Ce, Zr, Ni, Zn, Cd, Si, Mg, Al, Ca, Pd, Ag, Ba, Cu, Li, Co, La, Y, Sr, Mn, Rh, Pt, Nd, Sm, Pb, Cr, Ga and Sc to form primary particles and (2) an inorganic element different from the one selected in (1),
   (b) charging the droplets into a high temperature field together with a reactive gas in which the sprayed droplets are entrained thereby drying and thermally decomposing the droplets to form primary particles,
   (c) recovering the thus produced particles, and
   (d) washing the particles collected to remove water-soluble salts, thereby producing a nanostructural substance comprising a thin film-shaped material or a spherical-shaped material comprising primary particles having a particle diameter of not more than 30 nm.

2. The method according to claim 1, wherein said spherical-shaped nanostructural substance has an average particle diameter of 50 nm to 20 μm.

3. The method according to claim 1, wherein said primary particles constituting the nanostructural substance are composed of an oxide, a metal or a composite material thereof.

4. The method according to claim 1, wherein said primary particles constituting the nanostructural substance have an average particle diameter of 0.5 to 30 nm.

5. The method according to claim 1, wherein a ratio of a diameter of the primary particles of the nanostructural substance as calculated from results of measurement by an electron microscope to a crystallite size of the nanostructural substance as calculated from results of X-ray diffraction analysis is 0.8 to 1.25.

6. The method according to claim 1, wherein said nanostructural substance is constituted from the element as a single substance, a mixture of the elements or an oxide thereof.

7. A method of producing a nanostructural substance comprising a thin film-shaped material or a spherical-shaped material by spray thermal decomposition, the method comprising the steps of:
   (a) spraying to form droplets of a solution of a water-soluble salt of (1) titanium oxide and, optionally, at least one other element selected from the group consisting of Fe, Ce, Zr, Ni, Zn, Cd, Si, Mg, Al, Ca, Pd, Ag, Ba, Cu, Li, Co, La, Y, Sr, Mn, Rh, Pt, Nd, Sm, Pb, Cr, Ga and Sc to form primary particles and (2) an inorganic element different from the one or ones selected in (1),
   (b) charging the droplets into a high temperature field together with a reactive gas in which the sprayed droplets are entrained thereby drying and thermally decomposing the droplets to form primary particles,
   (c) recovering the thus produced particles, and
   (d) washing the particles collected to remove water-soluble salts, thereby producing a nanostructural substance comprising a thin film-shaped material or a spherical-shaped material comprising primary particles of titanium oxide having a particle diameter of not more than 30 nm.

8. The method according to claim 7, wherein said nanostructural substance contains also contains at least one element selected from the group consisting of Fe, Ce, Zr, Ni, Zn, Cd, Si, Mg, Al, Ca, Pd, Ag, Ba, Cu, Li, Co, La, Y, Sr, Mn, Rh, Pt, Nd, Sm, Pb, Cr, Ga and Sc.

9. The method of claim 7, wherein the titanium oxide particles have a spherical shape and have an average particle diameter of 50 nm to 20 μm.

10. The method of claim 7, wherein the product produced is a photocatalyst comprising the titanium oxide particles.

* * * * *